Inventor:
Edward R. Rusnok.
By S Lee & Lee
Attys

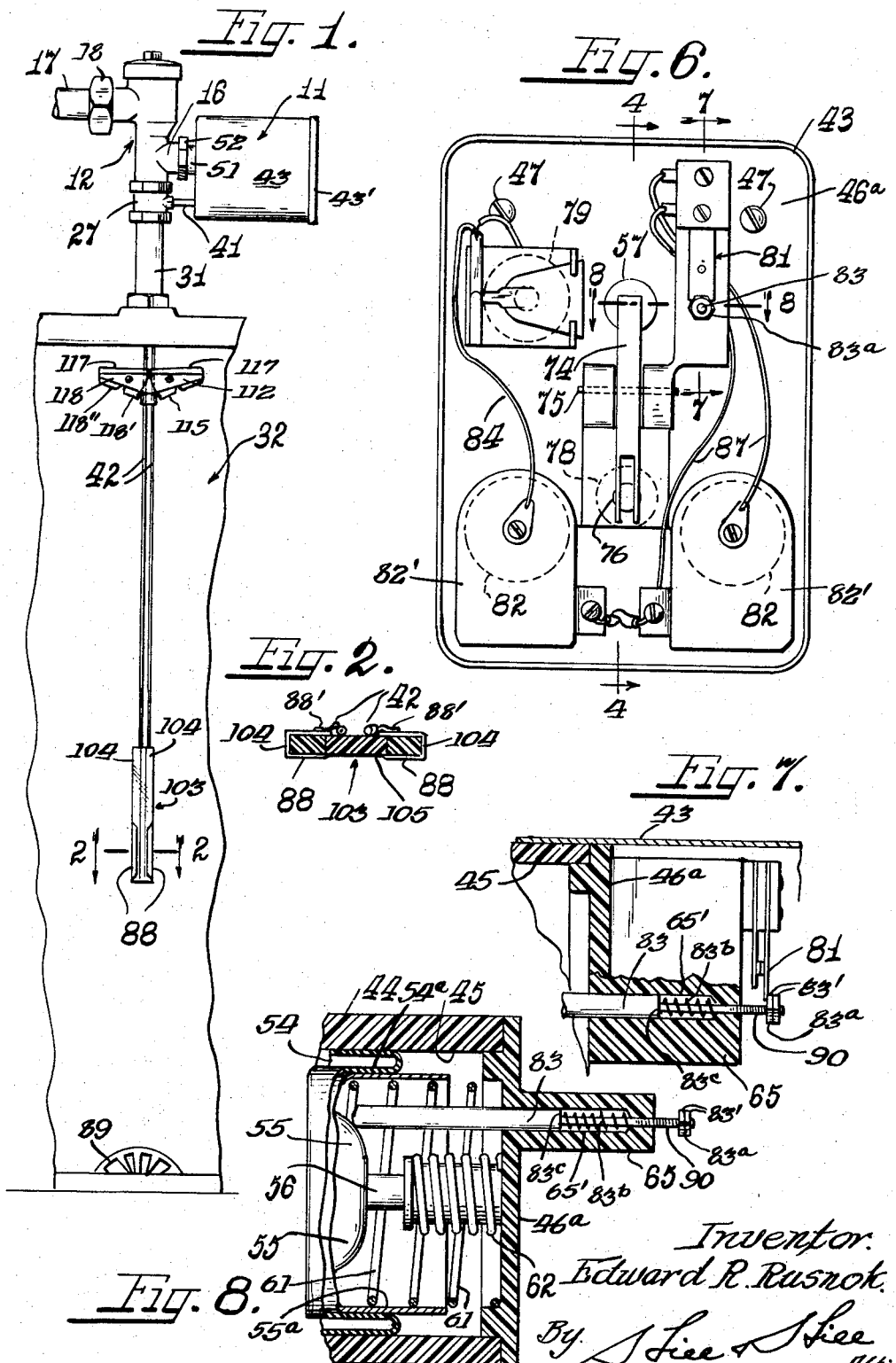

March 19, 1968 — E. R. RUSNOK — 3,373,449
AUTOMATIC VALVE ACTUATED URINAL
Filed Feb. 11, 1965 — 6 Sheets-Sheet 4

Inventor.
Edward R. Rusnok.
By Stice & Stice
Attys.

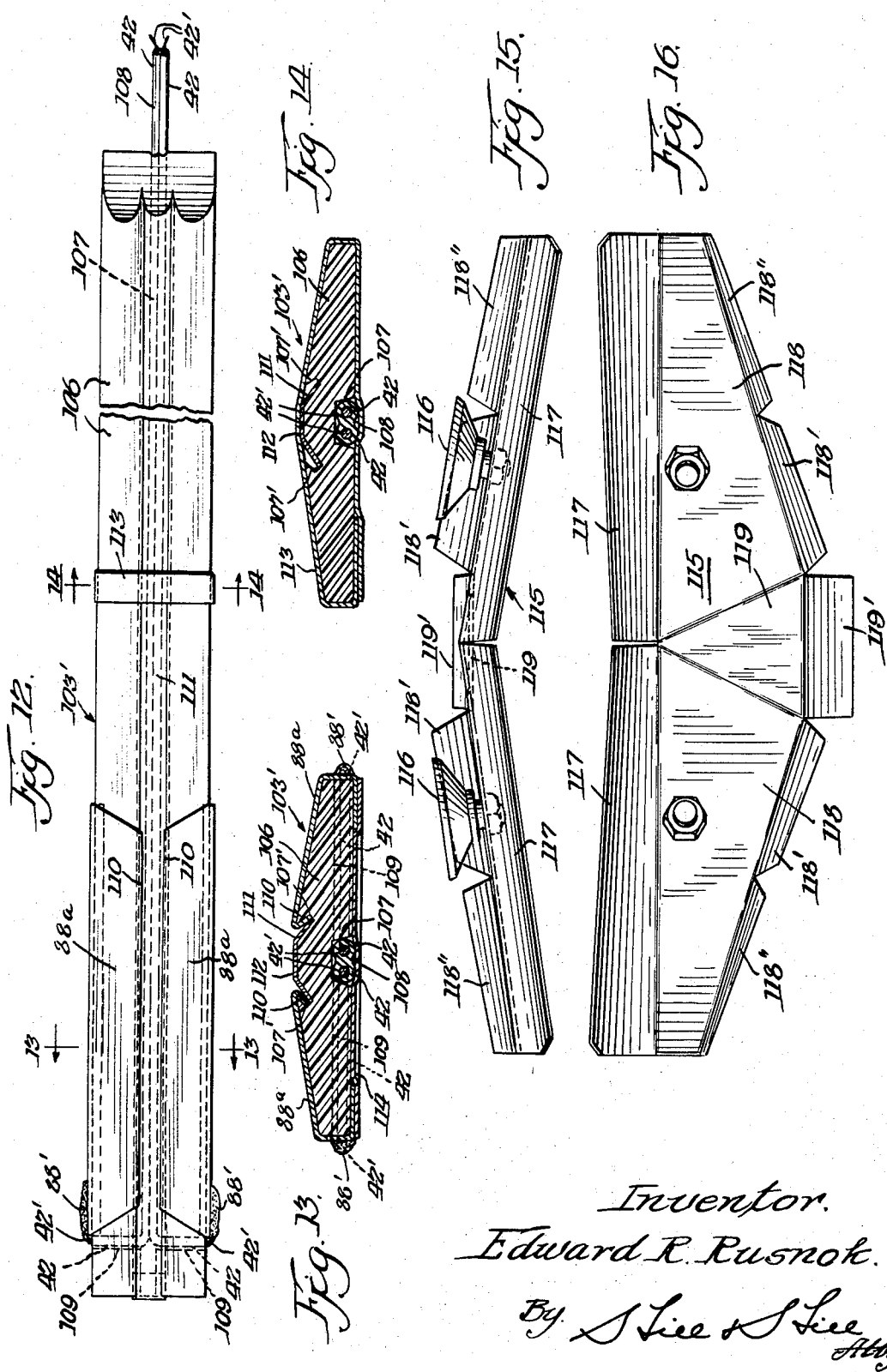

March 19, 1968     E. R. RUSNOK     3,373,449
AUTOMATIC VALVE ACTUATED URINAL
Filed Feb. 11, 1965     6 Sheets-Sheet 6

Inventor.
Edward R. Rusnok.
By Lee & Lee
Attys.

United States Patent Office 3,373,449
Patented Mar. 19, 1968

3,373,449
AUTOMATIC VALVE ACTUATED URINAL
Edward R. Rusnok, 1045 Delores Drive,
Bensenville, Ill. 60106
Filed Feb. 11, 1965, Ser. No. 431,934
13 Claims. (Cl. 4—100)

ABSTRACT OF THE DISCLOSURE

An electrically operated fluid-valve actuating device having a movable member that is released, in response to an electric signal, from a spring-loaded cocked position to actuate the valve, and having a diaphragm responsive to a change of pressure caused by operation of the valve, for returning the movable member to its cocked position.

---

This invention relates to improvements in electrical operating means for automatically actuating a flush valve or similar apparatus at selected intervals. The device of the invention is particularly adapted for operation of flush valves of the type commonly used in urinals and is only responsive to the discharge of liquid excretion into the urinal and is an improvement over the structure disclosed and claimed in Patent No. 3,115,643, granted Dec. 31, 1963 to Glenn R. Whitney.

More particularly, the device of the present invention includes a plunger carried on a bellows type diaphragm which is actuable in response to normal water pressure during a flushing operation to be loaded. It remains loaded until such time as liquid excretion is deposited upon spaced terminals electrically connected to a current source and relay, which relay functions, when electric current flows therethrough, to close a power circuit to a solenoid which then acts to release the plunger which then strikes and trips the pilot valve in a valve assembly of a type commonly used in flushing systems. The relay functions only when liquid excretion is deposited upon and bridges the terminals. This mode of operation is of particular advantage in that the terminals are never submerged in any body of water or other liquid. The device also has the advantage of breaking the power circuit when the device is reloaded immediately following initiation of a flushing operation.

It is therefore an object of the invention to provide a novel valve actuating mechanism.

Another object is to provide an electrically actuated valve actuating device that is responsive to the presence of liquid excretion on terminals connected in the circuit thereof.

Another object is to provide a novel combination of mechanical and electrical components operable to effect the opening of a valve.

Another object is to provide a valve actuating device of the character referred to which is ruggedly and inexpensively constructed, is positive in its operation, entirely automatic in operation and highly efficient in use.

Another object is to provide an improved embodiment of an electrically actuated valve actuating device that is responsive to the presence of liquid excretion on terminals connected in a circuit thereof.

Another object is to provide an improved terminal strip for the impingement of liquid excretion which may be positioned in conventional urinals and operatively connected to the flush valve actuating device either in old installations or in new installations.

Another object is to provide an improved urinal construction either of the upright type or wall hung type incorporating an improved form of terminal strip to which the electrical circuit of my improved valve actuating device for urinals may be operatively connected.

A still further object is to provide means for diverting the flush water over the terminal strip during the flushing operation of the valve actuating mechanism to properly cleanse the terminal strip to preset the valve actuating mechanism for its next use.

Still another object is to provide an improved form of a detachable flush water diverter for conventional wall hung and floor model installation to which the improved valve actuating device is installed.

Still another object of the invention is to provide an improved wall hung and floor model urinal which has incorporated therein integrally formed means for diverting the flushed water in part directly across a sensor and/or terminal strip also integrally formed with the urinal and properly positioned for a stream of liquid excretion to be directed against.

A still further object of the invention is to provide an improved electrical circuit for the valve actuating device wherein no outside power source is necessary.

A still further object of the invention is to provide another form of electrical circuit for the valve actuating device wherein a separate electrical power source such as A.C. or D.C. electrical energy may be provided to the motor and/or solenoid to actuate a flush valve or flush unit, and a second electrical power source A.C. or D.C. which may be provided for batteries or transformers operatively connected to the sensor for actuating the relay for operatively actuating the motor or solenoid which actuates the flush valve or autoflush unit.

Still another object of the invention is to provide an improved electrical circuit wherein the A.C. input is transferred to low voltage A.C. current for actuating the motor or solenoid to actuate the flush valve or auto-flush unit in operative relationship with a relay for actuating the solenoid electrically connected to the sensor or terminal strip, the low voltage transformer serving as a blocking transformer.

Another object of the invention is to provide an electrical circuit, a low voltage circuit comprising a transistorized relay switch for operating the solenoid of the valve actuating device for the urinal flush valve wherein there is a minimum current drain of the inexpensive low voltage batteries for the electrical circuit.

Another object of the invention is to provide a valve actuating device for a urinal flush valve that automatically flushes on demand to provide a complete sanitary flush with every use requiring no outside power source nor timing devices and in which maximum sanitation with minimum water consumption is obtainable.

Still another object of the invention is to provide a simple valve actuating device requiring a minimum of time for installing on urinal flush valves by replacing the flush valve handle with the valve actuating device, changing relief valve, mounting a pressure regulator under the valve body and applying a sensor to the urinal fixture with simple connections.

Still another object of the invention is to provide a power source for a valve actuating device for a urinal flush valve wherein the power source is self-contained and comprises inexpensive batteries which under normal conditions, a set of batteries will operate the valve actuating device for approximately one year.

A still further object of the invention is the provision of a valve actuating device for urinal flush valves in the field of urinal sanitation making it possible to provide maximum sanitation protection with minimum water consumption and cost, wherein maintenance departments of large industrial plants, office buildings, schools and public restaurants may now have easily installed proper flush action to urinals in a minimum of time so that wash room odors and clogged drains may now be considered as a problem of the past.

A still further object of the invention is to provide a valve actuating device for a urinal flush valve which requires a minimum of water for actuation and works on water pressure 20 to 100 lbs. p.s.i., wherein maintenance is reduced to a few minutes per year and which may be installed at a low cost so that the valve actuating device may pay for itself in a short time on water saving.

Still another object of the invention is to provide an improved flush valve and diaphragm therefor for use in combination with the improved valve actuating device of this invention.

A still further object of the invention is the provision of an improved automatic flush valve actuator for use with conventional urinal flush valves of the type commercially known as "Royal" or "Crown" Flush Valve manufactured by Sloan Valve Company in which the means for actuating the flush valve is directly actuated from 110 volt A.C. and the sensor therefor is operatively mounted in a low voltage alternating current circuit electrically coupled to the sensor of the automatic flush valve actuator.

The structure by means of which the above noted and other advantages and objects of the invention are attained will be described in the following specification, taken in conjunction with the accompanying drawings, showing a preferred illustrative embodiment of the invention, in which:

FIG. 1 is an elevational view of a urinal and water inlet, showing the novel device attached thereto;

FIG. 2 is a sectional detail view of the electrical terminals, taken substantially on line 2—2 of FIG. 1;

FIG. 6 is an end elevational view of the control device, with the end cover of the housing removed;

FIG. 7 is a sectional detail view taken substantially on line 7—7 of FIG. 6;

FIG. 8 is a fragmentary horizontal sectional view of the device, taken substantially on line 8—8 of FIG. 6;

FIG. 12 is an enlarged view of the terminal strip and/or sensor which is an improvement over the form of sensor strip of FIGS. 1 and 2;

FIG. 13 is a cross-sectional view of the sensor strip taken along line 13—13 of FIG. 12 and looking in the direction of the arrows;

FIG. 14 is a cross-sectional view of a sensor strip, taken along line 14—14, looking in the direction of the arrows of FIG. 12;

FIG. 15 is a plan view of a flush water diverter including suction cups for detachably mounting the flush water diverter on a face of a urinal wall contiguous to the discharge of the flush water from the flush water valve, as illustrated in FIG. 1;

FIG. 16 is a view in elevation of the flush water diverter of FIG. 15 for mounting as illustrated in FIG. 1;

Figures 3, 4:
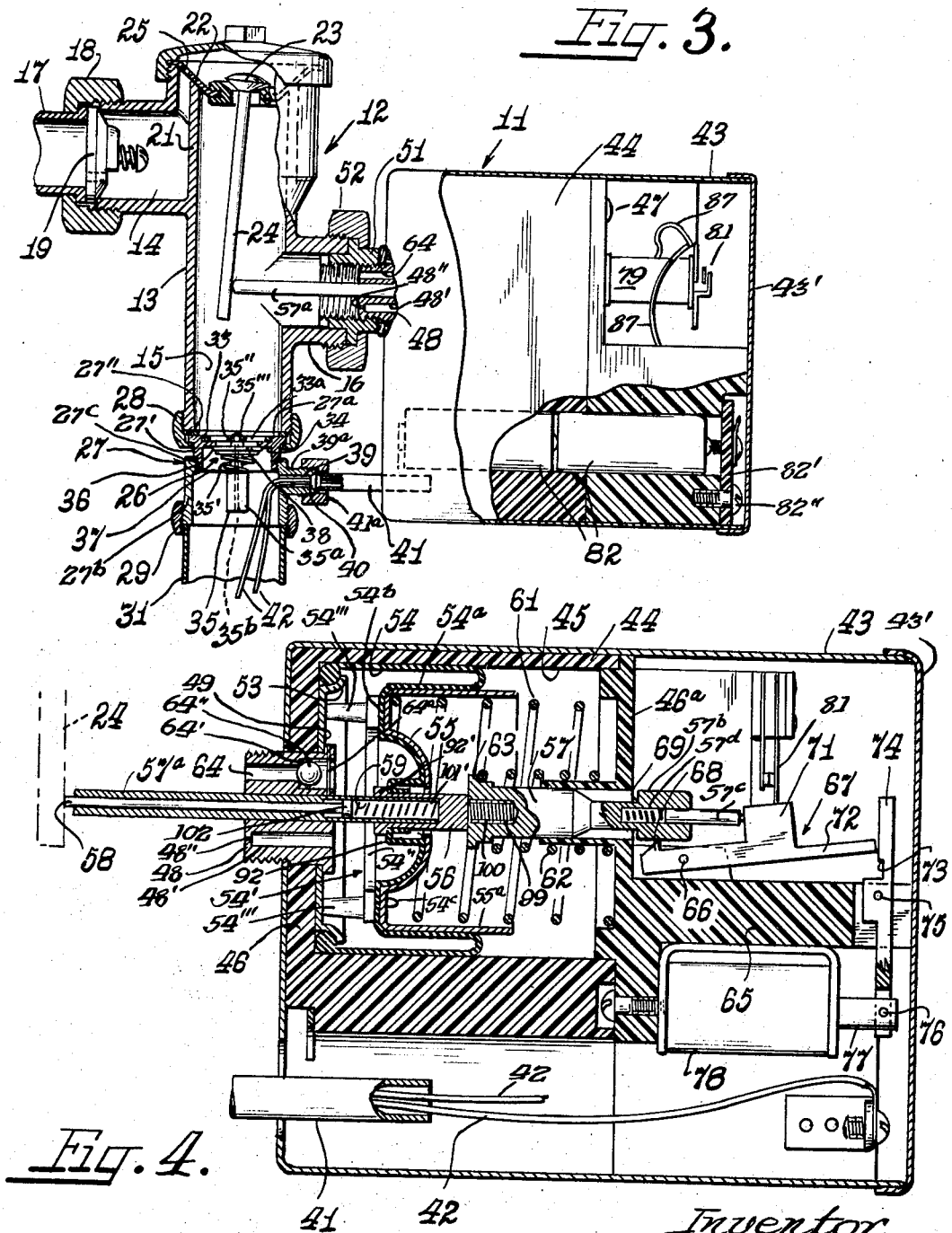
FIG. 3 is an enlarged sectional view of the water inlet valve assembly, showing the control device attached thereto.
FIG. 4 is an enlarged vertical sectional view of the control device, showing it in unloaded position.

Referring to the exemplary disclosure in the accompanying drawings, and particularly to FIG. 1, said device, generally indicated at 11, is mounted on the body of a conventional flush valve 12. This valve may be of any acceptable construction and may be generally described as being of a type commercially known as a "Royal" or "Crown" Flush Valve manufactured by Sloan Valve Company. As best shown in FIG. 3, such valve includes a vertically disposed body 13 having a transverse inlet 14 and a depending outlet 15. The outlet is formed with a transverse opening defined by an externally threaded tubular flange 16. A line conduit 17 is connected to inlet 14, as by means of a coupling nut 18 and it has a regulator 19 seated therein which is adjustable at the time of installation so as to regulate the volume of water delivered to the interior of body 13.

The mechanism of valve 12 is conventional and, as shown in a very simplified form, it includes an interior wall 21 terminating short of the upper end of body 13 and upon which is normally seated a diaphragm valve 22 having a pilot valve 23 seated therein. The pilot valve 23 has a stem 24 that extends downwardly into the vertical depending outlet 15 and terminates in the region of the axis of flange 16. Such a valve is normally held closed by balanced pressure on both sides of diaphragm valve 22, said diaphragm having a bleed opening 25 therein for this purpose. When the valve is to be actuated, the stem 24 is displaced upon application of force in a direction normal to its axis to tilt and open the pilot valve 23. As the closing pressure in the upper side of diaphragm 22 diminishes, the diaphragm valve 22 is displaced upwardly by the pressure of water against its under side outwardly of wall 21 to permit water to flow from the inlet 14 over the upper end of wall 21 and directly into the interior of outlet 15. The diaphragm valve 22 will close when sufficient pressure is built up over the top surface of said diaphragm valve through the admittance of water thereto through bleed opening 25, the pilot valve having previously closed upon removal of its displacing force.

For purposes to be made known hereinafter, the lower end of the depending outlet 15 is fitted with a flow regulator 26. As shown, this regulator is enclosed in a tubular fitting 27 comprising an upper annular flange 27′ that is secured to the bottom end of the outlet 15, as by a nut 28 with a washer 27″ interposed between the lower end of the outlet 15 and the upper face of the annular flange 27a. The tubular fitting 27 includes a lower annular fitting 27b complementally threaded to the lower threaded end of the upper annular flange member 27′ and sealed with a washer 27c. The threaded lower end of the lower annular fitting 27 is detachably connected by a flange nut 29, to an outlet conduit 31 connected with a urinal 32 or the like. As shown, this regulator comprises a spider 33 that is seated on an internal flange 34 in the upper annular flange member 27′ of the fitting 27, and the spider 33 has depending from it a tubular stem 35. Slidable on said tubular stem 35 is a valve plate 36 that is held normally in seating engagement with the bottom face of the flange 34 by a spring 37. The spring 37 is conical in shape as illustrated in FIG. 3 with the base of the spring in abutting engagement with the valve plate 36 and the lower end of the conical-shaped spring in abutting engagement with an enlarged portion 35a of the tubular stem 35. The tubular stem 35 is formed as shown in FIG. 3 with the enlarged portion 35a for mounting the conical spring 37 upon a reduced stem portion 35' abutting the center portion of the spider 33 and through which extends a further reduced portion 35" which is peened over at 35''' providing a passageway 35b from the interior of the depending outlet 15 to the interior of the tubular fitting 27 to provide suitable drainage of the flushed water which might be retained in the flush valve 12 after actuation of the valve actuating device 11. The spring 37 is preferably set or adjusted to resist discharge water pressure of about two pounds before moving into open position. This allows for a pressure build-up in outlet 15 to insure operation of the novel valve actuating device 11 to be more particularly described presently. It should be noted, however, that the valve plate 36 has a peripheral notch 38 to permit water remaining in the outlet 15 when the valve is closed to drain out in the event that any of the opening 33a might become clogged and also if the axial opening 35b in the tubular stem 35 which also serves to vent air as well as water might also become clogged. The lower annular fitting 27b of the tubular fitting 27 has a lateral opening 39 formed in the integral threaded stem 39a to which is threadedly connected a short length of tubing 41. The tubing 41 is suitably flanged at the left end to be received in the complementally formed coupling nut 41a. The coupling nut 41a is complementally threaded to the threaded end of the integrally threaded stem 39a and the nut and the stem are also complementally formed to receive an annular gasket and seal 40 formed of rubber or other suitable molded material. The tubing 41 and the lateral opening 39 is used to thread a pair of electric wires 42 from the valve control device 11 into the fitting through the gasket and seal 40 into the fitting and down through the outlet conduit 31 all in a manner and for a purpose to be explained presently. The annular gasket and seal 40 about the pair of electric wires with the coupling nut 41a affixed in place seal the lateral opening 39 preventing water from entering into the valve actuating device 11 at this point.

The valve actuating device 11 is mounted on the threaded tubular flange 16. It includes a housing 43 within which is mounted a substantially rectangular body 44 of electric insulation material, such as plastic, having a relatively large bore 45 (FIG. 4) therein in axial alignment with flange 16. The bore has end walls 46, 46a, the latter being removable from the body and held by screws 47 (FIG. 6). The wall 46 has an axial opening therein through which a fitting 48 extends. This fitting carries a disc 49 on its inner end that bears against the inside face of wall 46 and its outer end is externally threaded to receive thereon a flanged collar 51 which abuts the outside surface of said wall to mount the fitting 48 firmly on said wall. The collar 51 carries a flanged nut 52 that is threaded onto the externally threaded tubular flange 16 for securely mounting the device on the valve body.

The disc 49 preferably has a raised margin 53 beneath which the beaded edge of a flexible cup-like diaphragm 54 is clamped. This diaphragm has a reversedly folded wall 54a and an end wall 55, the latter mounting axially, a stud 56 onto one end of which is threaded firmly, a plunger element 57. The other end of said stud 56 mounts firmly a tubular extension 57a that projects through an axial bore in fitting 48. Mounted within the tubular extension and normally projecting outwardly beyond its free end is a depressible pin 58, and compression spring 59. This pin normally abuts the pilot valve stem 24 for a purpose to become apparent presently.

A light coil spring 61 normally urges the diaphragm 54 into the collapsed position shown in FIG. 4, and a load spring 62 is arranged around the plunger element 57, between a flange 63 thereon and the end wall 46a.

Insofar as it has been described, the operation of the device is substantially as follows:

Because there is no water pressure in valve body 13 at the time of the installation, the spring 61 will have collapsed the bellows-like diaphragm 54 and moved the plunger assembly to the left, as shown in FIG. 4, to thereby cause the pin 58 and the end of the tubular extension 57a to bear against the valve stem 24. This tilts the valve stem, rocks the valve body and admits water into the body 13. Water entering the body under a line pressure of 15 to 150 pounds p.s.i. is restrained from flowing out through the discharge line 31 until a pressure in said body of about two pounds is built up whereupon the resistance of flow regulator 26 is overcome and water will then be discharged through the outlet conduit and/or line 31 so long as the valve element remains open.

Figure 5:
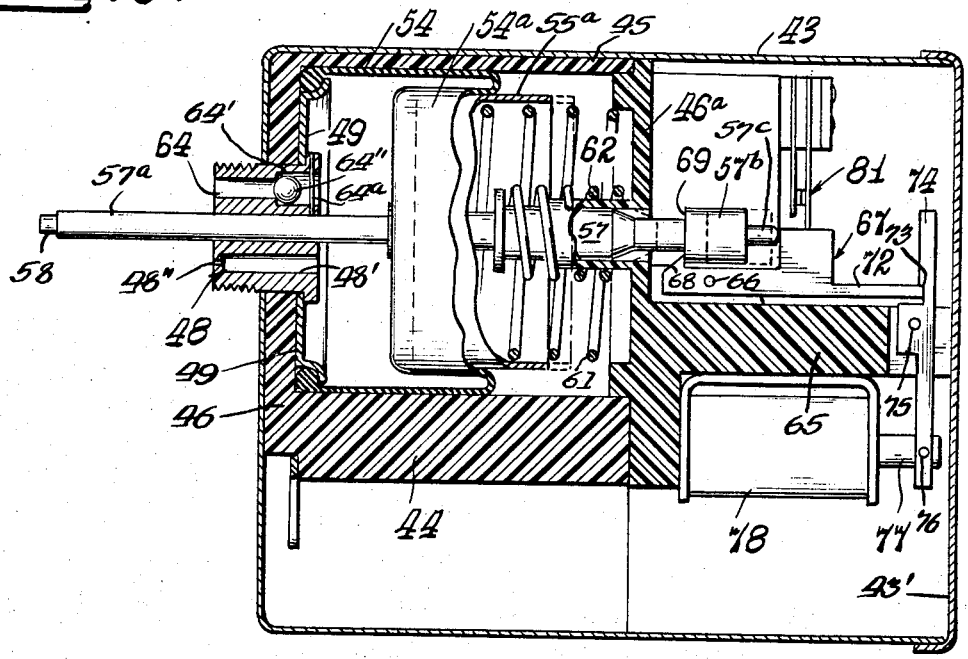
FIG. 5 is a view similar to FIG. 4, showing the control device loaded.

However, during pressure accumulation in a vertically disposed body of the flush valve 12, water flows through a port 64 in fitting 48 into the interior of the diaphragm 54 thus expanding the diaphragm from the position of FIG. 4 as located by the stop member 54' formed with an integral annular ring 54" and legs 54'''. This expansion takes place against the action of springs 61 and 62, to the right from the position shown in FIG. 4 into substantially the position shown in FIG. 5. In FIG. 5, the stop member 54' is not shown since this is unnecessary for understanding the control device in its loaded position in contrast to the unloaded position of the control device as shown in FIG. 4. Initial expansion of the diaphragm 54 carries the tubular extension 57a out of contact with the valve stem 24 but spring pressure by the compression spring 59 on the pin 58 retains the valve stem 24 in its tilted position, FIG. 3, momentarily and holds the pilot valve 23 open for a period of time required to permit full opening of the diaphragm valve 22 and compression loading and locking of the plunger element 57, as discussed hereinafter. The end wall 55 of a plastic cup 55a, FIG. 4, is affixed to a complementally formed annular surface 54b of the flexible cup-like diaphragm 54 by integrally formed lugs 54c, preferably three, equally spaced and extending through holes therefor in the end wall 55. The stop member may be suitably affixed to the annular surface 54b by an adhesive or preferably integrally formed with the diaphragm 54. Water in entering the port 64 moves the ball seal 64" to the right and movement is limited by the pin 64a, as illustrated. The port 64 is substantially ⅛" in diameter, the ball 64"—³⁄₁₆" in diameter and mounted within the ¼" counterbore 64'. The water upon actuation of the valve actuating mechanism is prevented from returning through the port 64 by the ball seal 64" and therefore the water discharges through the port 48', substantially ⅛" diameter and is restricted by the ¹⁄₆₄" diameter passage 46" controlling the period of operation as the flush valve is actuated. In the absence of the spring-biased pin 58, the pilot valve 23 would close immediately following initial withdrawal movement of the tubular extension 57a with the result that there would be insufficient water flow into the outlet conduit 31.

Referring to FIGS. 4 and 5, the outside face of wall 46a has a longitudinal projection 65 upon which is mounted pivotally, as at 66, a lock lever 67. This lock lever includes a dog portion 68 which engages behind a shoulder 69 on an enlarged portion 57b of the plunger 57 when in engaged position. The enlarged portion 57b operatively mounts a depressible pin 57c, spring-biased by a compression spring 57d, FIG. 4. The lock lever 57 also carries an upstanding lug 71 disposed in the path of the depressible pin 57c of the plunger 57 and which is struck by the depressible pin 57c as the plunger 57 moves to the right so as to rock the lock lever 67 into plunger engaging position as shown in FIG. 5. The lock lever 67 has a tail portion 72 that lies in the path of the notched tail portion 73 of a vertical arm 74 pivotally mounted at 75 and which depends from its pivot point a considerable distance and is connected, as at 76, to the end of an axial movable magnetic core 77 of a solenoid. The solenoid 78 normally is deenergized so that the vertical arm 74 will automatically engage over the tail portion 72 of the lock lever 67 and in engagement with the notch tail portion 73 locking the lock lever 67 in engagement with the shoulder 69 of the enlarged portion 57b of the plunger 57. In this manner, the diaphragm 54 is held extended and the plunger 57–57a withdrawn during a flushing operation and after the water in the body 13 of the flush valve 12 has drained out. Otherwise stated, the device, positioned as shown in FIG. 5, is cocked and is ready to actuate the pilot valve 23 when the lock lever 67 is released. Such release is effected electrically.

As best shown in FIG. 6, the device also mounts, on the wall 46a, a solenoid relay 79 of 400 ohms maximum pull at 14 ma. D.C., and a cut-off switch 81, ¾ to 1 amp. at 6 volts D.C., and a plurality of dry cells 82, preferably C-type, 1.5 volts D.C., of those commercially available including such as nickel oxide, manganese alkaline, mercury, alkaline heavy duty, and nickel cadmium and which may be long-life type or rechargeable. The dry cells 82 are enclosed in the lower end of the body 44. The function of these devices as well as the solenoid 78 can best be explained by reference hereinafter to the electrical wiring diagram illustrated in FIG. 9. Before discussing the wiring diagram, it should be observed that the cut-off switch 81 has associated with it a plunger and/or reciprocable pin 83, FIGS. 7 and 8, that extends through the housing end wall 46a and has its innermost end disposed in the path of the diaphragm end wall 55. The end of the plunger 83 is abutted by the diaphragm end wall 55 when the device is initially being loaded so as to momentarily open said switch. When the device is locked loaded, the diaphragm end wall 55 withdraws from engagement with said plunger 83 so as to permit the cut-off switch 81 to reclose.

Figure 9:
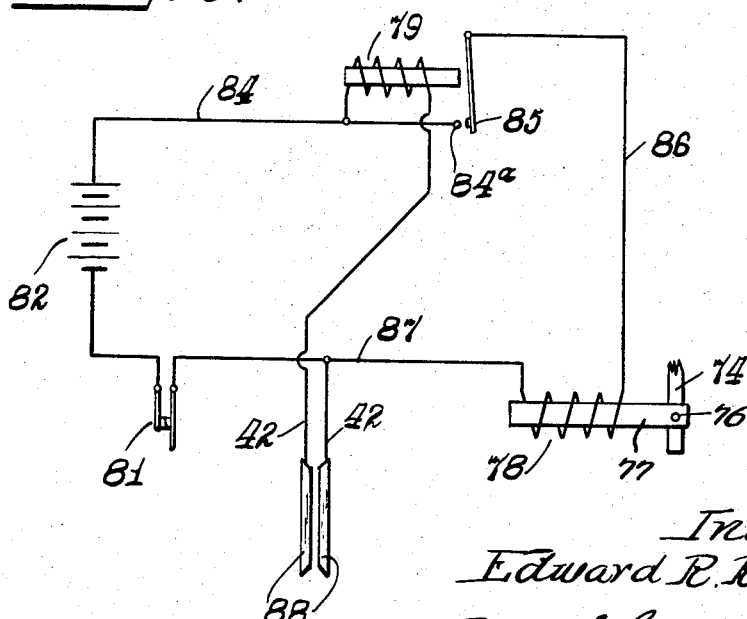
FIG. 9 is a schematic of the wiring of the device.

Referring to FIG. 9, one terminal of the batteries 82 is connected by a lead 84 to one terminal of relay 79 and to a switch terminal 84a. The movable switch blade 85, associated with terminal 84a is connected by lead 86 to one terminal of the solenoid 78, whereas the other terminal of said solenoid is connected, through cut-off switch 81 to the other battery terminal as by lead 87. The lead 87 is connected, as by one of the lead wires 42 to one of a pair of terminals 88, whereas the other of said pair of terminals is connected, as by the other lead 42 to the second terminal of relay 79. These components and circuitry function to unlock the loaded plunger 57 when the gap between the terminals 88 is electrically bridged by liquid excretion deposited thereon. As best shown in FIG. 1, the terminals 88 are located in a suitable position within the urinal 32 but above and out of contact with the usual water trap 89 at the bottom end thereof.

Now, assuming the valve control device to be loaded and locked, as shown in FIG. 5, when the terminals 88 are bridged current flows across them from the battery to relay 79 which is energized and causes switch terminals 84a–85 to close. Closing of said switch energizes the solenoid 78 which rocks the vertical arm 74 into unlocking position thus releasing the lock lever 67. The load spring 62 responds instantly to project the plunger 57–57a against the valve stem 24 thus opening the valve and starting the flushing operation. The initial flow of water into the valve body 13 will reset the diaphragm and plunger almost at once and at the same time flow regulator valve 26 opens and the flush water discharged through the outlet conduit and/or line 31 into the urinal will flush the liquid excretion from the terminals 88. This breaks the circuits in the system and allows the dog portion 68 of the lock lever 67 to reengage the shoulder 69 of the enlarged portion 57b of the plunger 57 and hold it reloaded for the next operational use even though the load pressure in the valve body 13 is dissipated.

The electrical circuit disclosed includes a current saving feature intended to cut off the current to the solenoid 78 immediately upon reloading of the flexible cup-like and/or bellows diaphragm 54. This comprises the cut-off switch 71 in line 87, which as shown functions as soon as the flexible cup-like and/or bellows diaphragm 54 is displaced inwardly a maximum distance by pressure of water thereon. When so displaced, its bottom wall 55 strikes against and displaces a reciprocable pin 83 (FIGS. 7–8) outwardly, which normally has its head 83a spring pressed against one blade of switch 81 to hold it closed. The head 83a preferably comprises adjustable locking nuts 83' to adjust the time of closing of the cut-off switch 81. The pin 83 is spring-biased by the compression spring 83b operatively positioned in the chamber 65' and abuts the shoulder 83c at one end; and at the other end, the end of the chamber 65' through which an integrally formed threaded end 90 extends and to which the lock nuts 83' are adjustably mounted for adjusting the point of closing of the cut-off switch 81 in the normally closed position thereof which is opened upon the movement of the diaphragm 55 to the right, FIG. 7. This pin displacement allows said switch to momentarily open (about ½ second) to break the current flow to the solenoid 78 and to terminals 88. This insures instantaneous release of the vertical arm 74 so that the lock lever 67 can engage with the plunger 57 and lock the device in its loaded position. To accomplish this locking, the bellows diaphragm recedes slightly from its extreme position shown in FIG. 8 to permit the switch 81 to reclose. It also interrupts the flow of current through terminals 88 prior to the time they are washed clean by the discharge of water through conduit 31. As a consequence there is a decided saving of current used and no chance of the device triggering prematurely.

Figure 10:
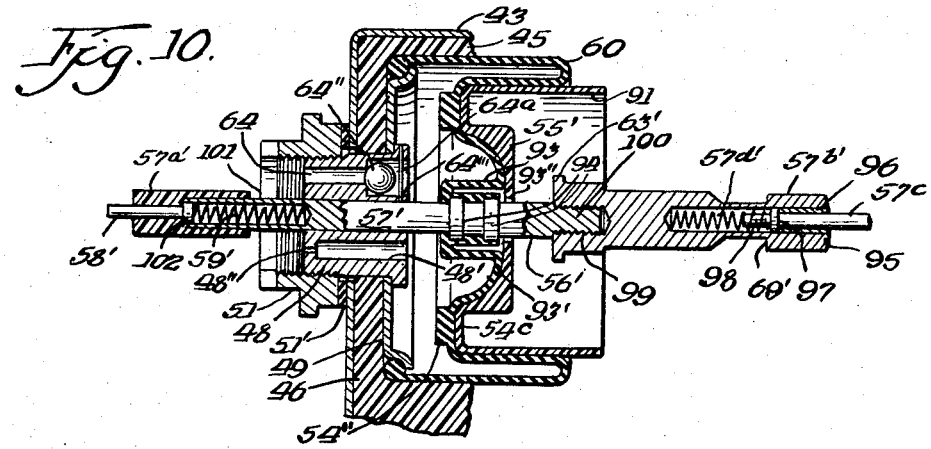
FIG. 10 is a partial sectional view of a diaphragm support modified from that of FIG. 4 with certain of the members removed and also showing the construction in cross-section of the plunger element and tubular extension.
Figure 11:
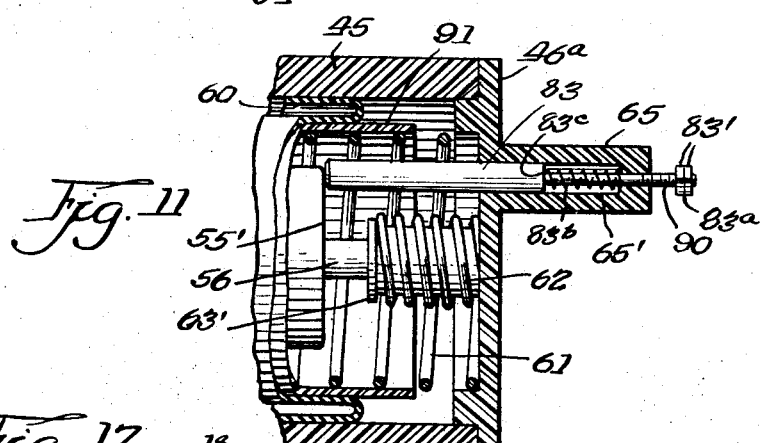
FIG. 11 is a fragmentary horizontal sectional view of the embodiment of FIG. 10 and taken substantially on line 8—8 of FIG. 6 and corresponding with the embodiment of FIG. 8.

Referring to FIGS. 10 and 11 which will be described respectively with respect to FIGS. 4, 5 and 8 in conjunction with FIG. 11 and wherein like or similar reference characters indicate the same or similar parts, there will be more particularly described certain improvements which have been found particularly desirable to improve the operation of the valve actuating device. Referring to FIG. 10, FIGS. 4 and 5, there will be particularly described the modified flexible cup-like diaphragm 60 as compared to the flexible cup-like diaphragm 54 of FIGS. 4 and 5. Dimensionwise the flexible cup-like diaphragm 60 of FIG. 10 is similar to the diaphragm 54 of FIGS. 4 and 5. It has been found, however, that it is unnecessary to incorporate the legs 54''' since in the return position, for example, as illustrated in FIGS. 4 and 10, the movement to the left as shown in FIG. 10 is substantially limited by the dimension of the parts and the annular ring 54'' is complementally formed to the annular periphery of the disc 49 so that if there should be increased movement to the left, as illustrated in FIG. 10, the flexible cup-like diaphragm 60 will be limited by the annular ring 54'' abutting the disc 49. This movement to the left is also limited by the movement of the like coil spring 61 and the load spring 62 as they expand to the left as the water is discharged through the port 48' of the restricted passage 48''. Referring to FIG. 10, a plastic cup 91 is similarly formed as the plastic cup 55a of FIG. 4. However, it has been found preferable to modify the plastic cup 91 with a somewhat cylindrical portion 55' as contrasted to the somewhat similar spherical end wall 55 of the embodiment of FIG. 4 to improve the engagement of the plunger 83, FIG. 8, with the squared-in surface of the end wall 55' of FIG. 11. The complementally formed surface of the flexible cup-like diaphragm 54 with that of the abutting surface to the end wall 55 is somewhat substantially identical to that of FIG. 10. However, referring to FIG. 4, a seal 92 is formed by reversing concentric portions thereof in abutting an annular member 92'. Referring to FIG. 10, an improved seal 93 is formed by molding concentric portions 93' and 93'', wherein the concentric portion 93'' is complementally formed to spaced annular rings 94 integrally formed with the stud 56 as illustrated in FIG. 10. The annular grooves complementally formed in the concentric portion 93' in engagement with the spaced annular rings 94 provide an effective water seal in the bellows-like and flexible cup-like diaphragm 60 and the threaded flange element 57'. It is believed that a more water-tight seal is formed in this embodiment of FIG. 10 than that as provided by the seal 92 and annular member 92' of FIG. 4, though both are satisfactory and function equally as well.

Referring to FIGS. 4 and 10, the threaded flange element 57 of FIG. 4 has been improved in the embodiment of the threaded flange element 57' of FIG. 10 in the improved construction of the depressible pin 57c' over the depressible pin 57c of FIG. 4. In the embodiment of FIG. 10, the enlarged portion 57b' is provided with an axially extending passageway 95 for mounting the compression spring 57d' and a modified depressible pin 57c'. The depressible pin 57c' is slidably mounted in a tubular member 96 adapted to be press fitted within the passageway 95 and to limit the outward movement of the depressible pin 57c' by the engagement of the annular stop 97 integrally formed with the depressible pin and the inner end of the tubular member 96. An inwardly extending and integrally formed stud member of the depressible pin 57c' serves to mount the outer end of the compression spring 57d', the inner end of the compression spring 57d' in operative engagement with the bottom of the passageway 95. In order to replace the depressible pin 57c' and/or the compressible spring 57d', the threaded flange element 57' may be held with a pliers or in a vise, and the depression pin 57c' pulled out which at the same time removes the press fitted tubular member 96. The parts may be replaced in reverse order. As illustrated in FIGS. 4 and 10, the threaded flange element 57 of FIG. 4 and the similarly formed threaded flange element 57' of FIG. 10 may be provided with a complementally formed female thread 99 to the nail thread 100 of the respective studs 56 of FIG. 4 and 56' of FIG. 10. As described above, the stud 56' of FIG. 10 is formed with the spaced annular rings 94 to provide the seal with the flexible cup-like diaphragm 60 of FIG. 10.

Referring again to FIGS. 4 and 10, the depressible pin construction and tubular extension 57a have been modified in the embodiment of FIG. 10. In certain conventional flush valves, the stem 24 with respect to the valve actuating device 11 may require a longer or shorter depressible pin construction. Referring to FIG. 4, the depressible pin construction 58, in conjunction with the tubular extension 57a of the stud 56 has been preferably modified to that of the embodiment of FIG. 10. In the embodiment of FIG. 10, the threaded flange element 57' has been formed with a drilled passageway 101 which would compare to a similar passageway 101' of the embodiment of FIG. 4. The tubular end of the threaded flange element 57' corresponds in part to the tubular extension 57a in which is mounted the compression spring 59 which is similar to the compression spring 59' of FIG. 10, whereas the tubular extension 57a is press fitted into the stud 56 after the depressible pin 58 and spring 59 have been assembled. The depressible pin 58 which is comparable to the depressible pin 58', which however is shorter, both being formed with an upset cylindrical head 102 against which the respective compression springs 59 and 59' abut in order to normally bias the respective depressible pins 58 and 58' outwardly, to contact the stem 24 of the flush valve 12, in its normal inoperative position. The tubular extension 57a' of the embodiment of FIG. 10 which is comparable to the tubular extension 57a of the embodiment of FIG. 4, is preferably formed of nylon to operatively mount the depressible pin 58' at the outer end and at its opposite end complementally formed as shown to be press fitted upon the outer end of the threaded flange element 57'. In the construction of the embodiment of FIG. 10 when compared to that of FIG. 4, it is quite apparent that any repair and replacement of the elements 57a' 58' and 59' may be readily accomplished after removal of the valve actuating device by uncoupling it from the flush valve 12 in the assembled position of FIG. 3, can repair and replace the elements 57a', 58' and 59' without the need of disassembling the valve actuating device as illustrated in FIG. 4.

Although perhaps one may disassemble the tubular extension 57a and the depressible pin 58 and compression spring 59 from the embodiment as shown in FIG. 4, it is believed that this would be difficult and eventually one would have to disassemble the valve actuating device 12 for a satisfactory replacement of the parts which might become corroded in certain water supplies wherein the devices might be installed. Nominally, however, such inspection and repair would be very infrequent.

Referring to the embodiment of FIG. 7 and the modification thereof in FIG. 11, any inspection and repair of either of these embodiments is simply accomplished by the detachment of the cover 43' and the removal of the wall 46a by the detachment of the screws 47.

Referring to FIGS. 1, 2, 12, 13 and 14 there will be particularly described the terminal strip or sensor 103 of FIGS. 1 and 2 and the embodiment of the improved sensor of 103' to improve the operation in flush water which might tend to corrode the soldered connections to the terminals. Referring to FIGS. 1 and 2, the terminals 88 are preferably U-shaped and mounted on the strips 104 of plastic insulation which in turn are affixed to a center strip 105 of suitable plastic insulation. It is preferable that the outer strip 104 will be formed from vinyl plastic and the center strip 105 preferably formed of Teflon. The wire of the electric wires 42 may be suitably silver soldered at 88' to the stainless steel terminals 88.

Referring to FIGS. 12, 13 and 14 an improved sensor or terminal strip 103' is preferably formed from a strip 106 of extruded vinyl plastic in the shape of the cross-section of FIGS. 13 and 14 with a bottom extruded groove 107 to receive the vinyl coated wire 108 comprising the flexible wires 42 for connecting the terminal strip terminals 88a to the valve actuating device as illustrated in FIG. 1, FIG. 3 and the wiring diagram, FIG. 9. The conducting wires 42' are preferably stranded copper wire in order to make a better soldered connection 88', the stranded wires being preferably silver soldered to the terminals 88a. The extruded plastic wiring 108 extends longitudinally through the extruded groove 107 and each wire 42 extends through the transverse groove 109 with the ends 42' of the stranded wire stripped and silver soldered to the end of the opposite edges of the terminal strips 88a as shown in FIG. 12 and FIG. 13.

The terminal ends 88a are formed in cross-section as illustrated in FIGS. 13 and 14 with inturned ends 110 complementally formed to the V-shaped grooves 107' of the center groove 107. A "Teflon" strip 111 is complementally formed to the center groove 107 as illustrated in FIGS. 13 and 14 to the V-shaped groove 107' so that the "Teflon" strip 111 may be held in place by the inturned ends 110 of the terminals 88a. It is also within the scope of the invention that the "Teflon" strip may be rectangular in shape only as is the center portion 112 and still be held in place by the inturned end 110. It is preferred that the "Teflon" strip shall extend from the left end of the terminal strip as shown in FIG. 112 to the right end of the plastic "vinyl" tape 113 which is wrapped about the vinyl strip 106 as illustrated in cross-section, FIG. 14. An adhesive coated vinyl tape 114, as shown in FIG. 14, preferably extends the full length of the vinyl strip 106 to provide an effective seal for the plastic insulated wire 108. This tape 114 is not shown in FIG. 14 but would cross the tape 113, or it is also within the scope of the invention that tape 113 may be wrapped about the longitudinally extending tape 114. In order to affix the sensor strip to the front wall of either a wall hung or floor mounted journal, if desired, a tape coated with adhesive on both sides may be affixed to the back of the sensor strip, one adhesive face being affixed to the sensor strip and the other adhesive face being affixed to the journal wall. It is preferred, rather than as shown in FIG. 1, that the sensor strip extend from the point as substantially shown in FIG. 1 up to the openings at the top of the urinal even in a floor mounted urinal as shown in FIG. 1, or in a wall mounted urinal. The wires 42 are then threaded to the conduit 31 as shown in FIG. 3 into the valve actuating device 11 as shown in FIG. 4 and connected to the proper terminals as illustrated in the wiring diagram of FIG. 9.

Although the sensor tape as described with reference to FIGS. 12, 13 and 14 is satisfactory, corrosion may take place depending upon the type of flush water in which the sensor tape may be operated. To overcome any corrosion, it is within the scope of the invention that the soldered terminals may be covered with vinyl tape or with a suitable "epoxy" cement or sealer. It is also possible to reduce corrosion by drilling holes in the vinyl strip to the back side of the respective contacts 88 and the ends of the wire 42' soldered in place. In this modification it would be preferred to stagger the holes so that any corrosion would not be directly across from the connections so that shorting due to corrosion would not take place readily. Again it is also desired to paint with vinyl or epoxy cement or sealer. The "Teflon" strip 111 permits the ready shedding of water after the flushing takes place so that there is no bridging of water or fluid excretion such as to drain the storage batteries or to trigger the valve actuating device except during actual use.

Referring to FIGS. 1, 15 and 16, there will be particularly described a flush water diverter 115. The flush water diverter is shaped as shown in FIGS. 1, 15 and 16, to fit the contour at the upper end of the front face of a urinal wall so that water coming through the opening at the upper end of the urinal from the outlet conduit 31 of the flush valve 12 may be so directed downwardly across the terminal strip of sensor 103 that the contacts 88 are thoroughly flushed off with clean water so that there is no liquid excretion remaining on the sensor strip such as to bridge the contacts 88 to trigger the valve actuating device except only as it is first being used as liquid excretion is directed against the contacts 88. The diverter 115 is provided with suction cups 116 to affix the diverter to the urinal wall and if necessary suitable adhesive may be used upon the surface of the contacts to affix the diverter to the urinal wall. This diverter is shaped as illustrated in FIGS. 15 and 16 with upwardly extending portions 117, similarly formed, and outwardly and downwardly directed portions 118 together with an intermediate portion 119. The upwardly and downwardly directed portions 118 are formed respectively with inturned portions 118' and 118" and the center or intermediate downwardly directed portion 119'. It is to be understood that this diverter is preferably formed from stainless steel though it may be formed from a suitable plastic or ceramic material and similarly fabricated for diverting the water downwardly and across the terminal contacts 88. Although this diverter 115 has been shown with respect to a floor model urinal, it is equally adapted for use with a wall hung urinal. This type of diverter is not necessary with all types of urinals to which the valve actuating device and sensor strips may be applied, but in some instances it is necessary to more correctly divert the flush water across the terminal strips as they are erected in conventional forms of urinals—either floor mounted or wall hung.

Figure 17:
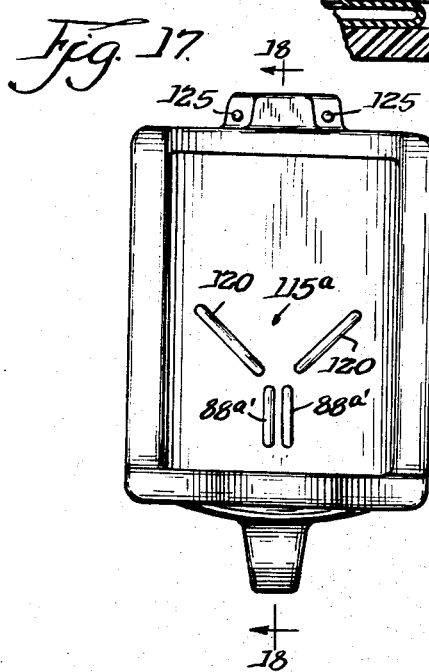
FIG. 17 is a view in front elevation of a urinal for wall installation, and illustrating integrally molded flush water diverters for directing flush water over terminals of a sensor for the electrical circuit of a flush valve actuating device.
Figure 18:
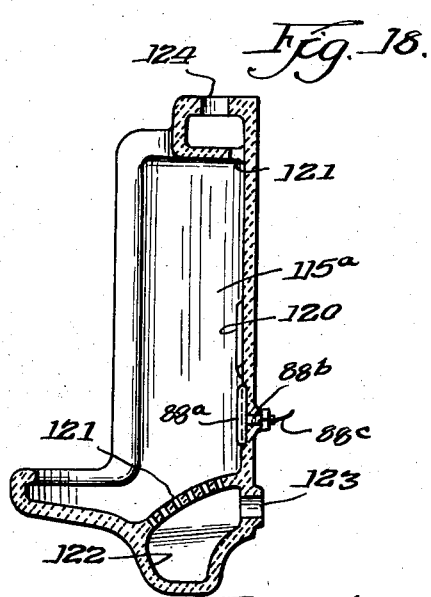
FIG. 18 is a vertical view, partly in cross-section taken along line 18—18 of FIG. 17 and looking in the direction of the arrows and illustrating the flush water diverter construction and the terminal construction of the sensor for the electrical circuit of a flush water actuating device.

Referring to FIGS. 17 and 18, there will be described an improved form of wall hung urinal, either of metal and porcelain coated or of ceramic material and porcelain coated as is well understood in the art, but particularly incorporates a flush water diverter 115a and metal terminal elements 88a. The flush water diverter 115a preferably comprises low ridges 120 inclined downwardly and spaced apart at their upper and lower ends as shown to direct flush water from an outlet opening or openings 121. The terminal strips 88a are preferably formed from stainless steel either as two separate pieces or it may incorporate a single ceramic form with metal strips 88a which may be integrally molded for example, to the ceramic back face of the urinal and may have suitable insulated ends 88b through which extend a suitable conductor 88c which in turn, during the erection of the wall hung urinal, may be connected into the electrical circuit of the valve actuating device as described with reference to FIG. 9. The urinal may be formed with a suitable ported trap cover 121 and also formed with a part of a trap 122 which may be connected to a suitable metal trap suitably affixed to the opening 123. The conduit 31 of FIG. 1 may be suitably connected to an opening 124 as is well understood in the plumbing art and may be affixed in its erected position to a wall upon which the urinal is mounted to suitable bolts extending through openings 125. Although it is preferred to mount the metal terminal strips 88a as illustrated in the wall hung urinal, the same relationship may be utilized with respect to a prefabricated upright urinal corresponding, for example, to that as described with reference to FIG. 1 but incorporating the integrally formed low ridges 120 and the metal terminals 88a. It is also within the scope of the invention that a suitable urinal may be fabricated wherein the terminals 88a, for example, are positioned underneath the trap cover 121 but will not be seen by the user but the flush water will be directed thereover to fully flush the terminal contacts 88a such that there will be no triggering of the valve actuating device or drain upon the batteries.

Figure 19:
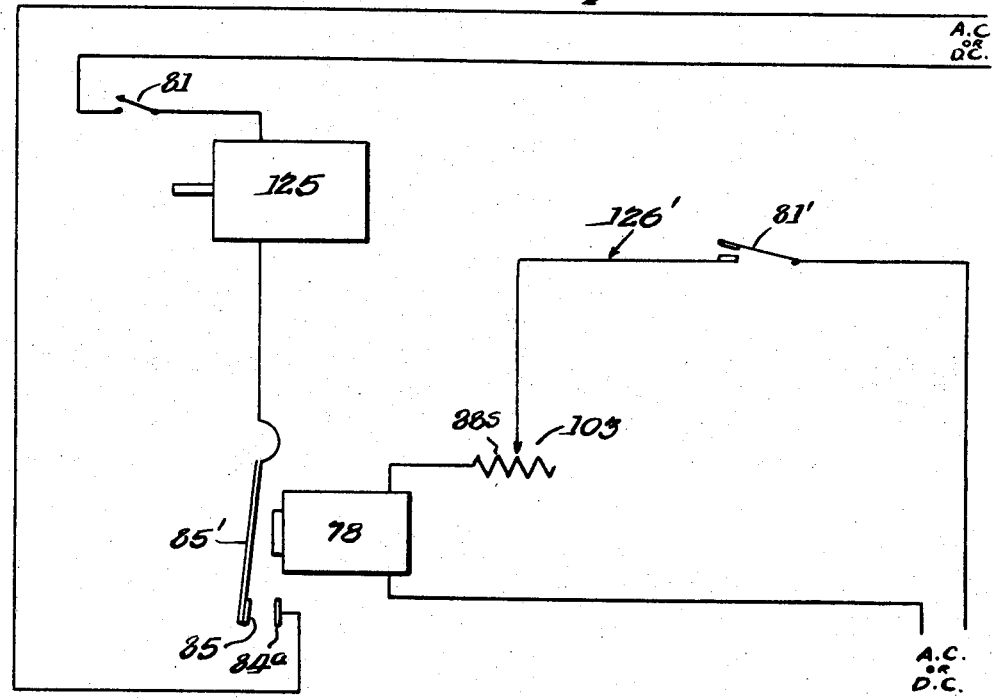
FIG. 19 is a schematic wiring diagram of a modified wiring diagram from that of FIG. 9.
Figure 20:
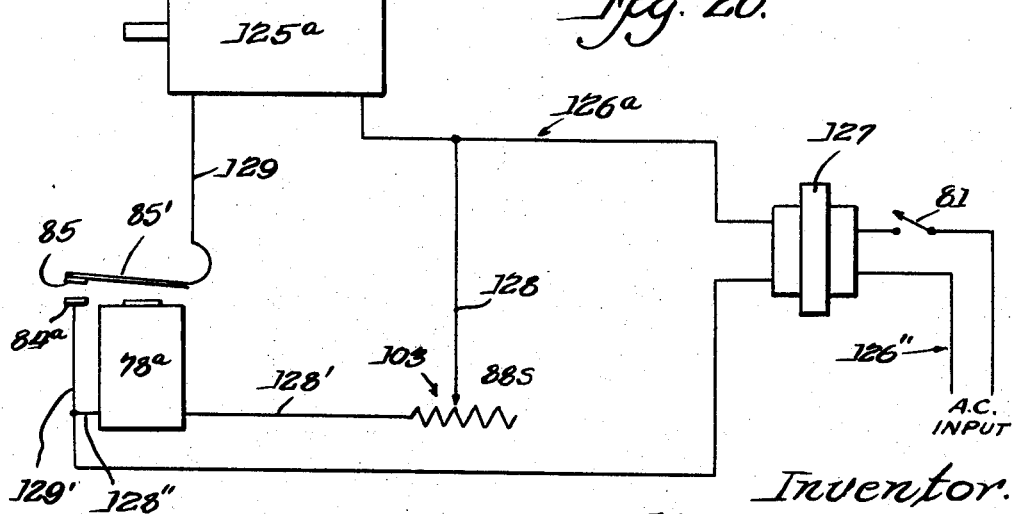
FIG. 20 is a schematic wiring diagram of another embodiment of the wiring diagram of FIG. 9.

Referring to FIGS. 19 and 20 there is illustrated other embodiments of the electrical circuit of FIG. 9 for actuating the valve actuating device of this invention. Referring to FIG. 19, there is illustrated one form of a wiring device for actuating a motor 125 or a solenoid 78 to actuate a flush valve 12 or urinal valve actuating device 11 such as previously described. The motor may be A.C. or D.C., and may be of the type of present commercial forms of actuating devices which may be operatively connected to a timing device or other similar device which operates the urinal flush valve in a predetermined sequence of operation, over a period, for example, such as in an office building for perhaps eight to twelve hours or even through a twenty-four hour period. There is provided an electrical circuit 126 including a switch 81 in series with the motor 125 or solenoid 78 wherein the relay contacts 85 and 84a are in series with the armature 85' of the relay 78. A sensor 88s illustrated by the schematic variable resistance is in series with the winding of the relay 78, a switch 81' and the circuit including these elements operatively and electrically coupled to a power source of A.C. or D.C. current. The A.C. or D.C. source of energy for the motor or solenoid 125 is preferably low voltage within the range of four to six volts preferably D.C., though as described later with reference to FIG. 20, a 110 volt source may be utilized with the voltage reduced to within the range from four to sixteen volts by a suitable blocking transformer. Similarly the A.C. or D.C. current supply for the solenoid 78 may be from the same supply as that for the motor 125 or a separate source of A.C. or D.C. current may be supplied at a different voltage and may be within the range of from four to sixteen volts, either A.C. or D.C. No voltage of this range can be considered as hazardous in conjunction with the sensor 88s upon which liquid excretion is directed as would a higher voltage source.

In the embodiment of FIG. 19, both cut-off switches 81 and 81' may be suitably actuated as the circuit of FIG. 9 with respect to the cut-off switch 81. Referring to FIG. 19, the switch 81 as described with the embodiment of the circuit of FIG. 9 is preferably normally closed through for the purpose of illustration it has been left in the open position. Likewise, the cut-off switch 81' of the circuit 126', preferably of low voltage, is normally in the closed position though for the sake of illustration has been left in the open position as shown. When liquid excretion is discharged against the terminals 88s comparable to the terminal strip 103 and terminals 88 of FIG. 1, the relay 78 is actuated through the applied voltage of the circuit 126′, and as the switch 81 of the circuit 126 is normally in the closed position as preset by the actuation of the valve actuating device 11, the motor and/or solenoid 125 is actuated causing actuation of the flush valve 12 and upon actuation of the flush valve 12 as described with reference to FIGS. 3 and 4, the electrical circuits 126 and 126′ are present for actuation of the valve actuating device 11 as liquid excretion is subsequently later discharged upon the terminals 88 permitting the circuit 126′ to function. The electrical power source—either D.C. or A.C. is preferably for dry cell batteries providing a voltage of substantially six volts D.C., or a suitable transformer which is a bell transformer wherein an applied A.C. voltage in the range of from six volts to sixteen volts may be applied, and such a voltage may be from a separate source for the circuit 126 or operative in parallel with the A.C. circuit 126′ with the voltage for the motor and/or solenoid 125 is within the same range as the voltage for the relay 78.

Referring to FIG. 20, another embodiment of an electric circuit 126a is electrically connected in series with a motor and/or solenoid 125a, a switch plate 85′, the movable contact 85 thereof, the stationary contact or switch terminal 84a to the terminals of the secondary circuit of a transformer 127 which is preferably a low voltage transformer serving as a blocking transformer. A cut-off switch 81 is operatively mounted in the A.C. electric input circuit 126″ preferably operating from 110 volt A.C. source of energy. The transformer 127 preferably reduces the 110 volt A.C. voltage to a secondary voltage within the range of from six to sixteen volts A.C. The terminals 88s of the terminal strip or sensor 103 schematically represented by the variable resistance is operatively connected to the secondary circuit of the transformer 127 by lead wires 128, 128′ operatively connected to the terminals of the sensor and also in series with the relay 78a and the lead wire 128″. The circuit of the relay 78a and the sensor 103 is in parallel with the circuit of the motor 125a and the respective lead wires 129, switch plate 85′ of the relay 78a, contacts 85 and 84a and lead wire 129′. The low voltage of the blocking transformer 127 within the range of from substantially six volts to sixteen volts is such that any hazard due to shocks is minimized within this voltage range. It is preferred that such voltage for the operation of the motor 125a and the relay 78a by the liquid excretion discharged against the terminals of a sensor and/or terminal strip will be a minimum voltage which will satisfactorily operate the device over a long period of time with a minimum of maintenance. In this circuit, a cut-off switch 81 is also actuated as described above for the valve actuating device 11 as particularly described with reference to FIGS. 1–9.

With the above circuits and slight modifications therefrom, conventional motors and/or solenoid-type actuators for conventional flush valves where preferably in these forms, the motors for actuating the valves and/or solenoids are preferably operated off of a 110 volt A.C. circuit to timer mechanisms which may either function periodically for portions of a day or throughout the twenty-four hours, it is possible to modify such devices utilizing the sensor and/or terminal strip mounted within the urinal as has been described with reference to FIG. 1 with a minimum amount of installation for the conversion. In such conversions depending upon the Code requirements for the particular city and/or state, it is preferred alternating current is used for the actuation of the motor or solenoid of conventional types of valve actuating devices to reduce the voltage so that the device is preferably operative in the range of from six to sixteen volts which may require the installation of a blocking transformer.

Although the circuits as described with reference to FIGS. 9, 19 and 20 are preferred, it is also within the scope of the invention to use a transistorized circuit for actuating the relay switch 78 from a six volt D.C. circuit, preferably using C 1.5 volt batteries in series. In such a transistorized circuit the maximum amperage would be substantially 3 amperes and the elements in the urinal would cause the circuit to actuate at substantially 50 ohms resistance and to turn off at substantially 1000 ohms resistance. The transistorized circuit may be simply described as a D.C. amplifier circuit operatively coupled to a voltage network in which there is a variable resistance in the form of the sensor elements in the urinal. Such a transistor circuit would include a transistor-type tube N669, a transistor-type 1N1563 diode or 1N2609, two 2N650 transistors and resistances in parallel in the range of 5 ohms, 100 ohms, 330 ohms, 360 ohms and 470 ohms.

Referring to FIGS. 4, 5 and 10 it is also within the scope of the invention to provide the ports and the ball valve construction of the following preferred sizes: the port 64, preferably 3/32″ diameter, the counterbore 64′ preferably 7/32″ in diameter, and the ball valve 64″ formed by a 5/32″ diameter ball. The port 48′ is preferably 1/8″ in diameter and the orifice 48″ is preferably 0.015″ in diameter. Instead of using the pin 64a mounted as shown in FIGS. 4, 5 and 10, it is also within the scope of the invention to use a nylon strip affixed in place over the end of the counterbore 64′ by suitable securing means such as a metal screw which may be a self-tapping screw.

It is therefore believed there has been disclosed a simple valve actuating device for actuating conventional flush valves with or without slight modifications to increase the efficiency thereof for use in urinal sanitation which is substantially completely automatic, simple to install and substantially self-contained. The valve actuating device of this invention preferably uses C-type batteries four in number which are readily installed, referring to FIG. 3, by the removal of the cover 43′ and the detachment of the cover 82′ for each set of two batteries by detaching the screw 82″. Replacement of the batteries after removal and inspection is in the reverse order. There has also been particularly described a valve actuating device for conventional flush valves that automatically flushes on demand, providing a complete sanitary flush with every use and as the sensor and/or terminal strips are preferably operatively mounted in the urinal to have the liquid excretion impinged thereon, this valve actuating device is always available. Furthermore it is unnecessary to have an outside power source though it is within the scope of the invention that where an outside power source may be within the Code requirements such a power source may be used. With this improved device it is unnecessary to use other forms of conventional timing devices wherein the flush valve will operate at successive predetermined periods. The valve actuating device of this invention provides maximum sanitation with a minimum water consumption.

With the simplified construction of this invention for installation of this device on urinals previously installed, the installation takes only a few minutes for most installations and may be installed on conventional flush valves by replacing the conventional flush valve handle with the valve actuating device of this invention, changing a relief valve, mounting a pressure regulator under the valve body and installing a sensor to the urinal fixture with a simple tool or connection. The power source which is preferably four C 1½ volt dry cells is self-contained and under normal conditions a set of batteries or dry cells will operate such a device for approximately one year. The valve actuating device of this invention may be suitably plated, for example, with a chrome finish or the like to match conventional flush valve fixtures.

The valve actuating device of this invention provides maintenance departments of large industrial plants, office buildings, schools, and public rest rooms, and may be easily installed to provide proper flush action to urinals relatively in a manner of minutes. With this type of installation, wash room odors and clogged drains are now a thing of the past. In the operation of this valve actuating device control begins its action as the stream of urine contacts the sensor and the urinal fixtures washed at the exact time and only when it is being used. With the installation of this device there are no timers to set, no outside power source to hook up under normal installation, but it may be modified to be actuated from other power sources. Therefore, with this device, clean, efficient, automatic sanitation is now possible with present plumbing and for new installations. The automatic valve actuating device of this invention is a real water saver and works on water pressure within the range of from substantially 20 to 100 pounds pressure. With this device also, maintenance is reduced normally to a few minutes once a year for the changing of the batteries. Since the cost of manufacture and installation thereof is relatively low, this device may be considered as paying for itself in a short time solely on the water saving alone, and especially so in communities having high water rates. The valve actuating device of this invention is believed to be an ideal control for urinal sanitation and especially so on conventional modern, publicly used urinal fixtures. There has also been disclosed a valve actuating device for conventional urinals and also urinals incorporating the sensor device integrally with the urinal of either the wall hung or upright type and wherein flush water is positively directed over the terminals of the sensor. It is also within the scope of the invention that either the wall hung or upright type of urinal may be so modified that the terminals of the sensor may not be in view exteriorly of the urinal but wherein the terminals of the sensor when not in the water of the trap but wherein the terminals may be mounted on the back wall of the urinal beneath the trap cover and so placed that the flush water must pass directly over the terminals to clean any excretion therefrom so that the valve actuating device may be preset for the next use. There has also been described simple electrical circuits and/or wiring diagrams for the actuation of the valve actuating device of my invention. For example, with respect to the various wiring diagrams, it is preferred to use a solenoid having a ¼ stroke with a 3 to 5 ounce pull. The contacts of the cut-off swedge are preferred to operate at 0.50 ampere and are identified as mechanically operated on-off within ½ second. The points of the relay are preferred to operate at 0.50 ampere. The resistance across the terminals of the sensor are considered to operate within a resistance between 500–200 ohms signal caused by the impingement of liquid excretion on the terminals. Operating on 6 volt D.C. "C" cells, the valve actuating device operates on 300 ma. total current consumed per cycle of operation.

Although there has been described a preferred embodiment of a valve actuating device, it is also within the scope of my invention to use a motor operated flush valve actuating device in conjunction with a conventional flush valve which also comprises a drive gear, a crank gear, a crank pin, a main shaft and connecting rod and push rod for actuating a relief valve stem of a conventional flush valve.

Although I have described a preferred embodiment of my invention, in considerable detail, it will be understood that the description thereof is intended to be illustrative, rather than restrictive, as many details of the structure disclosed may be modified or changed without departing from the spirit or scope of the invention. Accordingly, I do not desire to be restricted to the exact construction described.

What I claim as new and desire to secure by Letters Patent is:

1. Electrical flush valve actuating means responsive to the presence of liquid excretion on a pair of spaced terminals, said device comprising: a reciprocable plunger for actuating the valve, bellows means responsive to pressure of water operable to move the plunger into a withdrawn position, means to lock said plunger in said retracted position, solenoid means for releasing said lock means, a first normally open electric circuit for energizing said solenoid means including a current source and a relay-actuated normally open switch in said circuit, a second circuit including a current source and the relay for said switch and a pair of spaced terminals, said second circuit being closed when liquid excretion bridges said terminals to close the circuit to the relay for closing the relay switch to then energize the solenoid and unlock the plunger, spring means to advance the plunger into valve actuating position, and a normally closed switch common to both circuits adapted to open momentarily each time the plunger is moved into retracted position.

2. Electrical flush valve actuating means responsive to the presence of liquid excretion on a pair of spaced terminals, said device comprising: a reciprocable plunger for actuating the valve, bellows means responsive to pressure of water operable to move the plunger into a withdrawn position, means to lock said plunger in said retracted position, solenoid means for releasing said lock means, a first normally open electric circuit for energizing said solenoid means including a current source and a relay-actuated normally open switch in said circuit, a second circuit including a current source and the relay for said switch and a pair of spaced terminals, said second circuit being closed when liquid excretion bridges said terminals to close the circuit to the relay for closing the relay switch to then energize the solenoid and unlock the plunger, and spring means to advance the plunger into valve actuating position.

3. Electrical flush valve actuating means according to claim 2, in which the terminals comprise spaced electrodes mounted on an insulation strip located in the path of water flowing through said valve.

4. Electrical flush valve actuating means according to claim 2, wherein said valve includes a conventional body, and said plunger, bellows means, solenoid and relay are enclosed within a common casing affixed to said valve body.

5. Electrical flush valve actuating means responsive to the presence of liquid excretion on a pair of spaced terminals, said device comprising: a reciprocable plunger for actuating the valve, a diaphragm responsive to pressure of water operable to move the plunger into a retracted position, means to lock said plunger in said retracted position, solenoid means for releasing said lock means, a first normally open electric circuit for energizing said solenoid means including a current source and a relay-actuated normally open switch in said circuit, a second circuit including said current source and the relay for said switch and a pair of spaced terminals, said second circuit being closed when liquid excretion bridges said terminals to close the circuit to the relay for closing the relay switch to then energize the solenoid and unlock the plunger, and means to advance the plunger into valve actuating position.

6. Electrical flush valve actuating means responsive to the presence of liquid excretion on a pair of spaced terminals, said device comprising: a reciprocable plunger for actuating the valve, means responsive to pressure of water operable to move the plunger into a retracted position, a latch to hold said plunger in said retracted position, a lock lever engageable with said latch, solenoid means for disengaging said lock lever from said latch, a first normally open electric circuit for energizing said solenoid means including a current source and a relay-actuated normally open switch in said circuit, a second circuit including said current source and the relay for said switch and a pair of spaced terminals, said second circuit being closed when liquid excretion bridges said terminals to close the circuit to the relay for closing the relay switch to then energize the solenoid and release the plunger, and spring means to advance the plunger into valve actuating position.

7. An electrical flush valve actuating means comprising, a housing, a spring pressed plunger reciprocable in said housing and projecting from one end thereof, a diaphragm in said housing operably connected to said plunger, means to admit water into said housing for actuating the diaphragm and retracting the plunger into the housing, latch means to lock the plunger in its withdrawn position, and electrically actuated means operable to release said latch means.

8. As an article of manufacture, a flush valve for a urinal, said flush valve adapted to be connected to a source of flushing water and to a self-contained electrical flush valve actuating means, said flush valve comprising an inlet connection for operatively connecting the flush valve to a source of flushing water, a depending tubular outlet for operatively connecting the flush valve to a urinal and a tubular flange operatively connected to the depending outlet for operatively mounting the self-contained electrical flush valve actuating means, said flush valve at the upper end of the vertical depending outlet operatively mounting a diaphragm valve provided with a bleed opening, said diaphragm valve operatively mounting a pilot valve to which the stem is operatively connected, a tubular fitting detachably mounted on the lower end of the vertical depending outlet, a flow regulator including a ported spider, said spider operatively mounted on an internal flange of the tubular fitting, a tubular stem depending from the ported spider, a spring-biased valve plate normally held in seating engagement with the bottom face of said internal flange, the tubular fitting being provided with a lateral opening to which is operatively connected a short length of tubing operatively connected to the self-contained electrical flush valve actuating means, said lateral opening operatively positioned below the spring-biased valve plate, said self-contained electrical flush valve actuating means comprising a pair of spaced terminals adapted for operatively connecting to an electrical circuit of the self-contained electrical flush valve actuating means, and electrical wiring for the spaced terminals and adapted for operatively threading through an opening of the urinal to which the tubular fitting of the flush valve is operatively connected and through the tubular fitting and lateral opening and within the tubing for operatively connecting the wiring to the electrical circuit on the self-contained electrical flush valve actuating means, whereby upon actuation of the flush valve, the vertically depending stem of the diaphragm valve is displaced by an application of force by a plunger assembly of the self-contained electrical flush valve actuating means to tilt open the pilot valve, and as the closing pressure on the upper side of the diaphragm diminishes, the diaphragm valve is displaced upwardly be the pressure of water against its underside to permit water to flow from the inlet over the upper end of the wall of the flush valve and directly into the vertically depending outlet and the diaphragm valve will close when sufficient pressure is built up over the top surface of said diaphragm valve through the admittance of water thereto through the bleed opening, the pilot valve having previously closed upon removal of its replacing force by the resetting of the self-contained electrical flush valve actuating means, and said valve plate is normally held in place in seating engagement with the bottom faces of said internal flange by a spring, and said spring adapted to be adjusted within a predetermined pressure range to resist discharge water pressure within said predetermined pressure range before moving into its open position, so that there is a pressure build-up within the depending outlet to insure operation of said self-contained electrical flush valve, and said valve plate provided with a peripheral notch to permit water remaining in the depending outlet when the valve plate of the flow regulator is closed to drain out.

9. As an article of manufacture, a self-contained electrical flush valve actuating means adapted to be operatively connected to a flush valve, said self-contained electrical flush valve actuating means adapted to actuate a stem of the flush valve with the flush valve actuating means operatively mounted on the flush valve, said self-contained electrical flush valve actuating means comprising electro-magnetic means comprising means for operatively engaging the stem of the flush valve for actuating the flush valve, and means for operatively connecting the flushing water of the flush valve to the electro-magnetic means for resetting the self-contained electrical flush valve actuating means, and said electro-magnetic means including an electrical circuit operatively connecting said electro-magnetic means and to terminals operatively mounted within a urinal for the impingement of liquid excretion therein, said electrical circuit including a source of electrical energy, and said electro-magnetic means being actuated upon liquid excretion bridging the terminals of the electric circuit, whereby the electro-magnetic means is actuated actuating the flush valve and the electro-magnetic means is reset for a successive use upon actuation of the flush valve, the electro-magnetic means being reset by the water pressure within the flush valve operatively connected to the self-contained electrical flush valve actuating means.

10. As an article of manufacture, a flush valve actuating means adapted to be operatively connected to a flush valve of a urinal and said flush valve adapted to be operatively connected to a source of flushing water and to a urinal to be flushed, said flush valve including a valve stem, said flush valve actuating means comprising means for operatively actuating the valve stem of the flush valve, said flush valve actuating means comprising means for operatively mounting the means for actuating the valve stem of the flush valve and also for operatively connecting diaphragm means to the flush valve so that the pressure of the flushing water actuates the diaphragm means, electric circuit means including terminal means operatively mounted within the path of the flushing water discharged by the flush valve into the urinal and also operatively connected to a source of electrical power, said electrical circuit means including a solenoid switch operatively connected to the terminals and to the source of electrical energy, and solenoid means operatively connected to the diaphragm means and to the source of electrical energy for latching the diaphragm means in its latched position under the action of water pressure from the flush valve as the flush valve is actuated, the solenoid means having been actuated upon the actuation of the relay means being energized by the discharge of liquid excretion across the terminals which causes the actuation of the diaphragm means in a predetermined cycle of operation.

11. As an article of manufacture, a flush valve actuating means adapted to be operatively connected to a flush valve for a urinal, said flush valve adapted to be connected to a source of water for discharging flushing water across the surface of the urinal, said flush valve including a valve stem, said flush valve actuating means comprising electro-motive means for actuating the stem of the flush valve, said flush valve actuating means including means for operatively connecting the electro-motive means to the flush valve for the actuation of the valve stem by the electro-motive means, an electrical circuit for connecting the electro-motive means to a source of electrical energy and including switch means adapted for controlling the electro-motive means at a predetermined cycle, another electrical circuit means operatively connected to a source of electrical energy, said second-mentioned electrical circuit means including a relay switch operatively connected to the first-mentioned electrical circuit means, said second-mentioned electrical circuit means also including terminals operatively mounted on the flushing surface of the urinal to which the flush valve actuating means is adapted to be operatively connected, switch means operatively connected to the second-mentioned circuit means, and said switch means of both electrical circuit means adapted to be preset in a predetermined cycle of operation of the electro-motive means whereby upon liquid excretion directed against the terminals causes the relay means to actuate the electrical circuit in which the electro-motive means is operatively connected so that the electro-motive means actuates the flush valve and controls the switch means of both electrical circuit means.

12. As an article of manufacture, a flush valve actuating means adapted to be operatively connected to a flush valve for controlling flushing water discharged through the urinal for flushing the urinal, said flush valve including a valve stem, said flush valve actuating means comprising electro-motive means for actuating the valve stem of the flush valve, said flush valve actuating means comprising electric circuit means including transformer means operatively connected to a source of alternating current, said transformer means adapted for reducing the voltage of the source of alternating current to a reduced voltage for actuating the electro-motive means, said electric circuit means including relay switch means operatively connected parallel to the electro-motive means for actuating the electro-motive means in a predetermined cycle, terminal means operatively connected in series with the relay switch means, said terminal means operatively connected to a flushing surface of a urinal and operative upon the direction of liquid excretion against the terminals causing the relay switch means to close and to actuate the electro-motive means, for actuating the flush valve, and upon flushing water cleaning the terminals of the liquid excretion the relay switch is opened disconnecting the electro-motive means.

13. As an article of manufacture, a flush valve actuating means adapted to be operatively connected to a urinal flush valve, said flush valve including a valve stem, said flush valve actuating means comprising an electrical circuit means operatively connected to a low voltage direct current source of energy, said electrical circuit means including an electro-motive means adapted to be operatively connected to the flush valve for actuating the valve stem of the flush valve for discharging flushing water across a flushing surface of a urinal, relay switch means operatively connected to the electro-motive means, said electrical circuit means including terminals for operatively mounting upon the flushing surface of the urinal against which liquid excretion may be directed for actuating the relay switch means, said relay switch means operatively connected to the relay coil, said relay coil adapted to close a switch in the circuit of the electro-motive means, and said relay switch means operative to actuate the electro-motive device in a predetermined cycle within the flushing cycle of the flush valve during the period when liquid excretion is directed against the terminals causing the relay switch means to actuate until the end of the cycle of the electro-motive means after the flushing water discharged from the flush valve has cleaned the terminals of the liquid excretion.

References Cited
UNITED STATES PATENTS

| | | | |
|---|---|---|---|
| 1,335,380 | 3/1920 | Littlefield | 4—100 |
| 1,404,155 | 1/1922 | Littlefield | 4—100 |
| 1,441,007 | 1/1923 | Littlefield | 4—100 |
| 1,683,062 | 9/1928 | Bright | 4—100 |
| 1,709,083 | 4/1929 | Littlefield | 4—100 |
| 3,115,643 | 12/1963 | Whitney | 4—100 |
| 3,239,847 | 3/1966 | Parri | 4—100 |

LAVERNE D. GEIGER, *Primary Examiner.*

H. K. ARTIS, *Assistant Examiner.*